United States Patent
Li et al.

(10) Patent No.: US 7,953,171 B2
(45) Date of Patent: May 31, 2011

(54) TRAINING SYMBOL FORMAT FOR ADAPTIVELY POWER LOADED MIMO

(75) Inventors: Qinghua Li, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/820,470

(22) Filed: Jun. 22, 2010

(65) Prior Publication Data

US 2010/0254476 A1    Oct. 7, 2010

Related U.S. Application Data

(63) Continuation of application No. 12/386,748, filed on Apr. 22, 2009, now abandoned, which is a continuation of application No. 11/024,587, filed on Dec. 29, 2004, now Pat. No. 7,542,515.

(51) Int. Cl.
    H04K 1/10         (2006.01)
(52) U.S. Cl. ....................................................... 375/260
(58) Field of Classification Search .................. 375/260, 375/267, 347; 370/206–210
    See application file for complete search history.

(56) References Cited

U.S. PATENT DOCUMENTS

| | | | |
|---|---|---|---|
| 5,892,796 A | 4/1999 | Rypinski | |
| 6,473,467 B1 | 10/2002 | Wallace et al. | |
| 7,280,840 B2 | 10/2007 | Murakami et al. | |
| 7,542,515 B2 | 6/2009 | Li et al. | |
| 2006/0140290 A1 | 6/2006 | Li et al. | |
| 2007/0230431 A1 | 10/2007 | Driesen et al. | |
| 2009/0207928 A1 | 8/2009 | Li et al. | |

FOREIGN PATENT DOCUMENTS

| | | |
|---|---|---|
| EP | 1170897 A1 | 1/2002 |
| JP | 2002118534 A2 | 4/2002 |
| JP | 2002374224 A2 | 12/2002 |
| JP | 2004254285 A2 | 9/2004 |
| JP | 2004336670 A2 | 11/2004 |
| JP | 2004336746 A2 | 11/2004 |
| TW | 349296 | 1/1999 |
| TW | 386324 B | 4/2000 |
| TW | 449984 B | 8/2001 |
| TW | 544997 B | 8/2003 |
| TW | 584360 Y | 4/2004 |
| TW | 586722 Y | 5/2004 |
| WO | 2006/072103 A1 | 7/2006 |

OTHER PUBLICATIONS

Barhumi, I. et al., "Optimal Training design for MIMO OFDM Systems in Mobile Wireless Channels", IEEE Transactions on Signal Processing, vol. 51, No. 6, Jun. 2003, pp. 1615-1624. Abstract Only.
Codreanu, M. et al., "Adaptive MIMO-OFDM with Low Signalling Overhead for Unbalanced Antenna Systems", Personal Indoor and mobile Radio Communications, Sep. 5-8, 2004, pp. 1-12.

*Primary Examiner* — Kevin Y Kim
(74) *Attorney, Agent, or Firm* — Thorpe North & Western LLP

(57) ABSTRACT

Training symbol formats are provided for use in a MIMO based wireless communication system that uses adaptive power loading. In at least one embodiment, power loading information is used to calibrate constellation points for user data.

20 Claims, 9 Drawing Sheets

TRAINING SYMBOL FORMAT FOR ADAPTIVELY POWER LOADED MIMO

CROSS REFERENCE TO RELATED APPLICATIONS

This application is a Continuation of U.S. patent application Ser. No. 12/386,748, filed Apr. 22, 2009, entitled "TRAINING SYMBOL FORMAT FOR ADAPTIVELY POWER LOADED MIMO," which is the further Continuation of U.S. patent application Ser. No. 11/024,587, filed Dec. 29, 2004, entitled "TRAINING SYMBOL FORMAT FOR ADAPTIVELY POWER LOADED MIMO," now U.S. Pat. No. 7,542,515, both of which are herein incorporated by reference in their entirety.

TECHNICAL FIELD

The invention relates generally to wireless communication and, more particularly, to techniques and structures for performing channel training in a MIMO based wireless system.

BACKGROUND OF THE INVENTION

Multiple input multiple output (MIMO) is a radio communication technique in which both a transmitter and a receiver use multiple antennas to wirelessly communicate with one another. By using multiple antennas at the transmitter and receiver, the spatial dimension may be taken advantage of in a manner that improves overall performance of the wireless link. MIMO may be performed as either an open loop or a closed loop technique. In open loop MIMO, the transmitter has no specific knowledge of the condition of the channel before data signals are transmitted to the receiver. In closed loop MIMO, on the other hand, the transmitter uses channel-related information to precondition transmit signals before they are transmitted to better match the present channel state. In this manner, performance may be improved and for receiver processing may be simplified. There is a need for techniques and structures for efficiently implementing closed loop MIMO in wireless networks.

DETAILED DESCRIPTION

Figure 1:
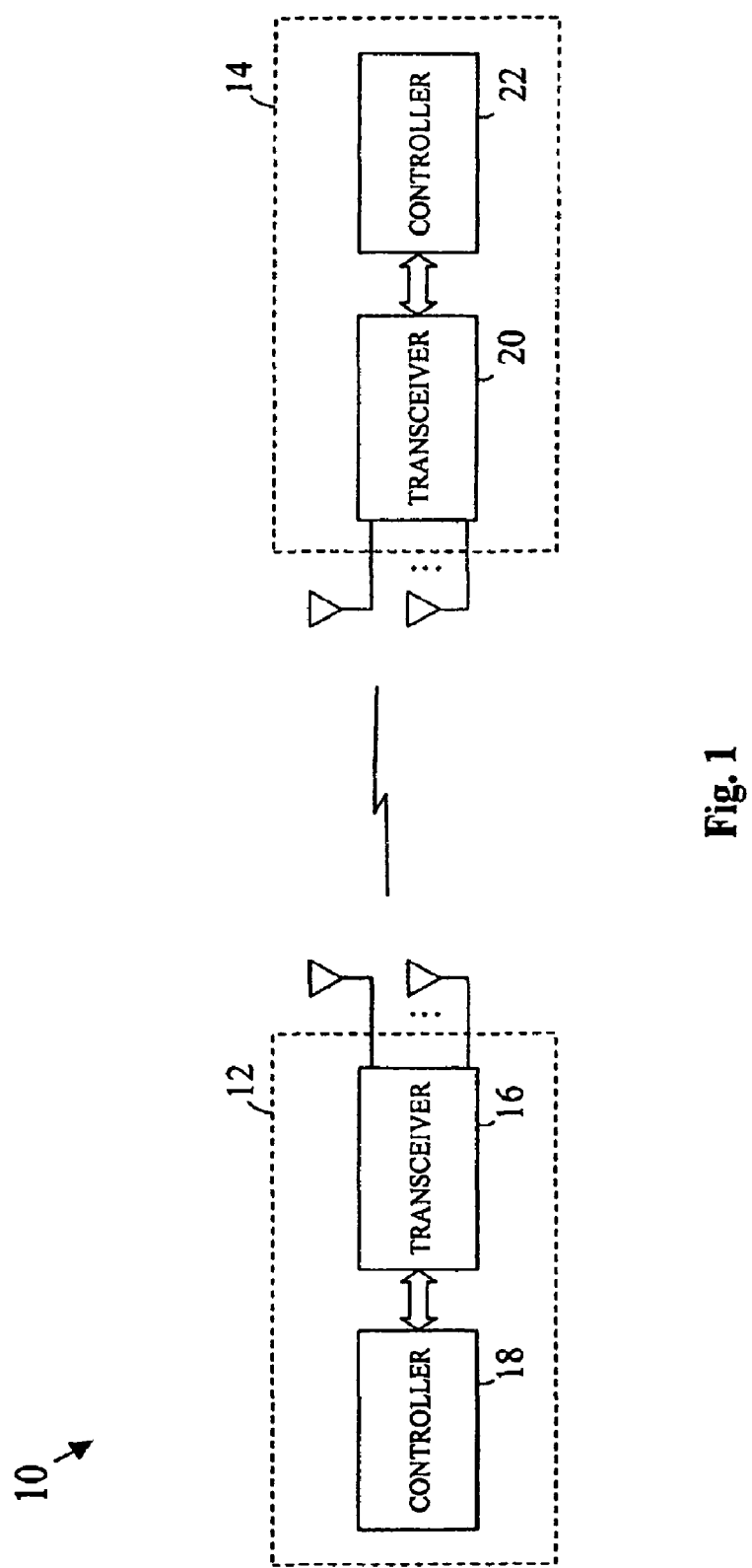
FIG. 1 is a block diagram illustrating an example wireless networking arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example wireless networking arrangement 10 in accordance with an embodiment of the present invention. As illustrated, a first wireless system 12 is communicating with a second wireless system 14 via a wireless communication link. The first wireless system 12 may be, for example, a wireless access point (AP) or base station and the second wireless system 14 may be a wireless station (STA), or vice versa. In such a case, the wireless AP may be providing access to a larger network (wired and/or wireless) for the STA. In some alternative implementations, the first and second wireless systems may both be wireless APs or both be wireless STAs. Other arrangements are also possible. As used herein, the term "station" or "STA" is intended to encompass any type of wireless component, device, or system that is capable of accessing a network through a remote wireless access point or base station. As illustrated, the first and second wireless systems 12, 14 each have multiple (i.e., two or more) antennas. The wireless channel between the first wireless system 12 and the second wireless system 14 is a multiple input, multiple output (MIMO) channel. In the illustrated embodiment, the first and second wireless systems 12, 14 each have a single set of antenna s that may be used for both transmit and receive functions. In other embodiments, the first wireless system 12 and/or the second wireless system 14 may use a different set of antennas for transmit and receive. Any type of antennas may be used including, for example, dipoles, patches, helical antennas, and/or others.

In the embodiment of FIG. 1, the first wireless system 12 includes a wireless transceiver 16 and a controller 18. The controller 18 is operative for carrying out the digital processing functions required to support closed loop MIMO operation for the first wireless system 12. The controller functions may be carried out using, among other things, one or more digital processing devices such as, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. The controller 18 may also include one or more discrete digital elements such as, for example, bit interleavers, bit de-interleavers, modulation units, demodulation units, discrete Fourier transform units, inverse discrete Fourier transform units, etc. The wireless transceiver 16 is operative for performing the radio frequency (RF) related functions required to (a) generate RF transmit signals for delivery to the multiple antennas during transmit operations and (b) process the RF signals received by the multiple antennas during receive operations. Separate transmit and receive chains may be provided within the transceiver 16 for each corresponding antenna. Digital to analog converters and analog to digital converters may be used in the interface between the controller 18 and the transceiver 16. The second wireless system 14 of FIG. 1 also includes a wireless transceiver 20 and a controller 22. These units will perform functions similar to the corresponding units within the first wireless system 12.

In at least one embodiment, the first wireless system 12 and the second wireless system 14 use orthogonal frequency division multiplexing (OFDM) techniques to transmit information through the wireless channel. In an OFDM system, data to be transmitted is distributed among a plurality of substantially orthogonal, narrowband subcarriers. The first wireless system 12 and the second wireless system 14 may also implement a form of MIMO known as SVD (i.e., singular value decomposition) MIMO. SVD MIMO will be discussed in greater detail below. To facilitate understanding and simplify notation, the discussion that follows may be with respect to a single subcarrier in an OFDM system. It should be appreciated, however, that the below described functions may need to be performed for each of the subcarriers within a multi-carrier system. Interpolation between subcarriers may also be used to reduce the amount of calculation and feedback.

In a MIMO-based system, a wireless channel may be characterized using an $n_{RX} \times n_{TX}$ channel matrix H, where $n_{RX}$ is the number of receive antennas and $n_{TX}$ is the number of transmit antennas. Using SVD, the channel matrix H may be decomposed as follows:

$$H = UDV^H$$

where U and V are unitary matrices (i.e., matrices with orthonormal columns and unit column norm), D is a diagonal matrix, and $V^H$ is the Hermitian of unitary matrix V. A unitary matrix U has the following property:

$$U^H U = I$$

where I is the identity matrix. In the channel matrix decomposition set out above, the matrix V may be referred to as a beam forming matrix (precoder). This beam forming matrix V may be generated in a receiving device by first determining the channel matrix H (using, for example, received training information) and then decomposing the matrix H using SVD techniques (or other similar techniques). The beam forming matrix V (or a portion thereof) may then be transmitted back to the transmitting device to be used in the generation of a subsequent transmit signal. A separate matrix V may be required for each subcarrier in a multicarrier system. Another method to acquire the beam forming matrix is to employ reverse link channel sounding and channel reciprocity. In this case, for example in the downlink, the receiver sends training symbols to the transmitter so that the transmitter learns about the uplink channel matrix. If calibration is done before the sounding, the uplink channel and downlink channel are reciprocal and then the downlink channel matrix H can be obtained by simply transposing the uplink channel matrix. Finally, the beam forming matrix can be computed from H.

The elements of the diagonal matrix D are known as the singular values, or eigenvalues, of the channel matrix H. The beamforming matrix V is made up of a number of column vectors, known as eigenvectors, that correspond to the eigenvalues. Each of the eigenvectors may define a spatial channel (or eigenmode) within the MIMO channel. The stream of data flowing through a particular spatial channel is known as a spatial stream. The eigenvalues will typically be indicative of the relative strength of the corresponding eigenvectors/spatial channels. Sometimes, it may be advantageous to limit a MIMO channel to only the strongest of the available spatial channels (e.g., to the spatial channels associated with the 2 largest eigenvalues). This may, for example, reduce the overall amount of feedback to be delivered to the transmitting device.

Figure 2:
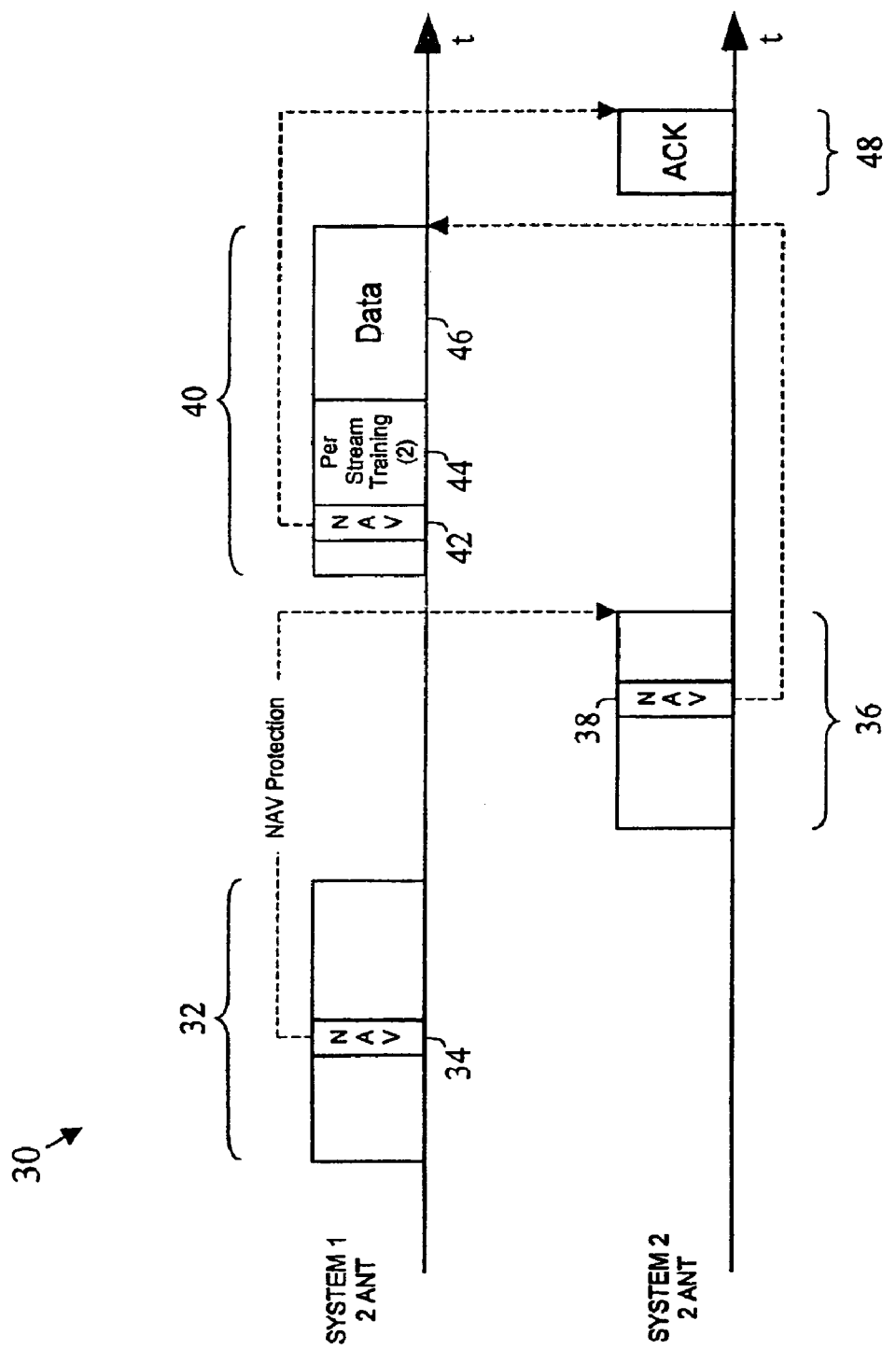
FIG. 2 is a signaling diagram illustrating an example frame exchange sequence that may be used to perform a data transfer within a MIMO-based wireless network in accordance with an embodiment of the present invention.

FIG. 2 is a signaling diagram illustrating an example frame exchange sequence 30 that may be used to perform a data transfer within a MIMO-based wireless network in accordance with an embodiment of the present invention. The upper portion of the diagram illustrates the transmissions of a first wireless system (e.g., first wireless system 12 of FIG. 1) and the lower portion illustrates the transmissions of a second wireless system (e.g., second wireless system 14 of FIG. 1). In the frame exchange sequence 30 of FIG. 2, a short interframe space (SIFS) may exist between each successive pair of frames in the sequence. The first wireless system initially determines that it needs to transmit user data to the second wireless system. As illustrated in FIG. 2, the first wireless system then transmits a training initiation frame 32 to the second wireless system to initiate channel training. In response, the second wireless system transmits a training response frame 36 to the first wireless system. The training initiation frame 32 and the training response frame 36 will result in channel related information being acquired by the first wireless system. The first wireless system may then use this channel information during the generation of the subsequent data frame 40. Any type of channel training may be carried out using the training initiation frame 32 and the training response frame 36. Either implicit or explicit channel feedback techniques may be used. After the second wireless system receives the data frame 40 from the first wireless system, the second wireless system may transmit an acknowledgement frame 48 to the first wireless system to indicate that the data frame 40 was successfully received.

As illustrated in FIG. 2, in at least one embodiment, each frame in the frame exchange sequence 30 may include a network allocation vector (NAV) that is used to reserve the network medium for the next frame or next several frames to be transmitted in the sequence. Thus, the NAV 34 within the training initiation frame 32 will reserve the medium for the training response frame 36, the NAV 38 in the training response frame 36 will reserve the medium for the data frame 40, and the NAV 42 in the data frame 40 will reserve the medium for the ACK frame 48. Other wireless devices and systems in the region may read a NAV within a transmitted frame and subsequently refrain from transmitting signals until after the associated reservation period has ended. In this manner, collisions may be avoided.

As described above, after the first wireless system receives the training response frame 36, it will transmit a data frame 40. In addition to the NAV 42 described above, the data frame 40 may also include per stream training 44 and user data 46. The per stream training 44 includes channel training symbols for each of the spatial channels/streams being used. These per stream training symbols may be used to perform subsequent channel training, if required, on a spatial channel by spatial channel basis. The spatial channels that are currently being used may be identified by the previous channel training that was carried out using the training initiation frame 32 and the training response frame 36. Because FIG. 2 relates to a 2×2 MIMO system, the maximum number of spatial channels is 2. Thus, the per stream training 44 trains for 1 or 2 spatial channels/streams. Other MIMO channels may train for a larger number of spatial channels/streams. The per stream training 44 may be subdivided into multiple training time slots for use in performing the per stream training. The number of training time slots may equal, for example, the number of spatial channels/streams being trained.

The user data 46 is the useful data that is being delivered to the second wireless system from the first wireless system, as opposed to the overhead data. As used herein, the phrase "user data" may include any type of useful data including, for example, computer application data, text data, graphics data, video data, audio data, voice data, and/or other non-overhead data forms. The channel information acquired by the first wireless system may be used to precondition the user data 46 before transmission. For example, a beamforming matrix may be used to provide beamforming for the first wireless system when transmitting the user data 46. The present invention relates to formats that may be used to provide per stream training (e.g., per stream training 44 of FIG. 2) within a wireless frame. It should be appreciated that the frame exchange sequence 30 of FIG. 2 is merely illustrative of one possible sequence that may be used within a wireless network in accordance with the present invention and is not meant to be limiting.

Figure 3:
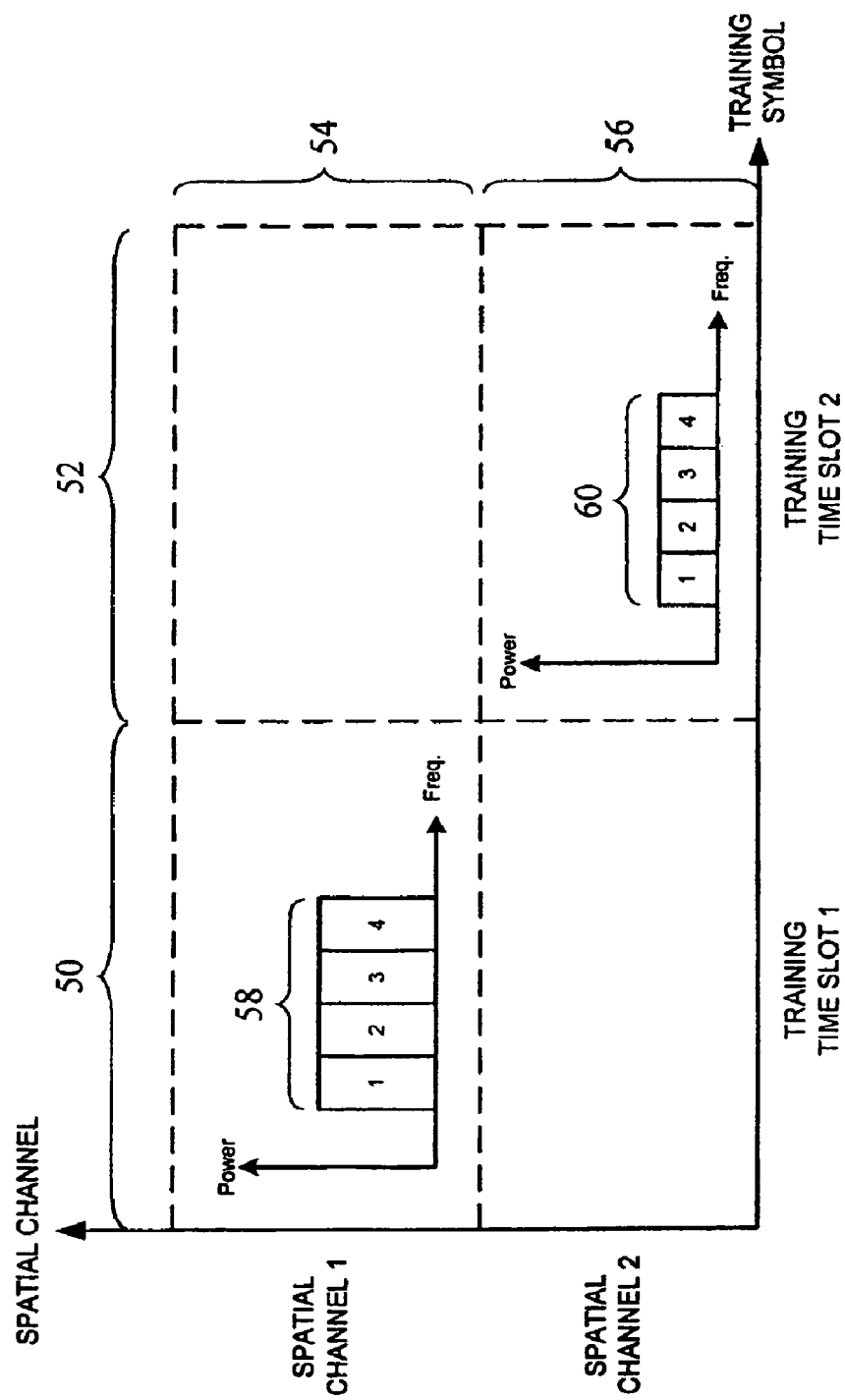
FIG. 3 is a diagram illustrating a per stream training format that has been proposed for use in a MIMO channel where OFDM is being used.

FIG. 3 is a diagram illustrating a per stream training format that has been proposed for use in a MIMO channel where OFDM is being utilized. As illustrated, a per stream training interval is subdivided into a first training time slot 50 (TRAINING TIME SLOT 1) and a second training time slot 52 (TRAINING TIME SLOT 2). The MIMO channel is made up of a first spatial channel 54 (SPATIAL CHANNEL 1) and a second spatial channel 56 (SPATIAL CHANNEL 2). During the first training time slot 50, a first OFDM training symbol 58 is transmitted within the first spatial channel 54. The first OFDM training symbol 58 may be a predetermined OFDM symbol that includes one known data symbol for each of a plurality of OFDM tones (labeled 1, 2, 3, and 4 in FIG. 3). The data sequence within the first OFDM training symbol 58 would be known within a receiving device. During the second training time slot 52, a second OFDM training symbol 60 is transmitted within the second spatial channel 56. The second OFDM training symbol 60 may include the same sequence of data symbols as the first OFDM training symbol 58. Although only four tones are illustrated in each of the OFDM training symbols 58, 60 of FIG. 3, it should be appreciated that, in practice, an OFDM training symbol may include a much larger number of tones (e.g., 256 tones in one implementation).

In a MIMO based system, a technique known as adaptive power loading may be practiced to enhance overall throughput within the MIMO channel. As described previously, the spatial channels making up a given MIMO channel will typically have different strengths associated with them. These strengths may be proportional to the corresponding eigenvalues of the $n_{RX} \times n_{TX}$ channel matrix. Adaptive power loading recognizes that enhanced performance can be achieved by distributing the total transmit power so that a higher transmit power is used within spatial channels having a higher relative strength and a lower transmit power is used within spatial channels having a lower relative strength. Other power distribution strategies may also be applied to enhance performance. Thus, when user data is to be transmitted from a first wireless system to a second wireless system through a MIMO channel (see, for example, user data 46 in FIG. 2), a determination may be made, based on previously acquired channel information, to use a different transmit power level for the user data in each of the available spatial channels. As the channel information will change over time, this power loading will "adapt" over time.

Referring back to FIG. 3, in the illustrated approach, the power levels used to transmit the first OFDM training symbol 58 within the first spatial channel 54 and the second OFDM training symbol 60 within the second spatial channel 56 will be the same as the power levels used to subsequently transmit the user data within the corresponding spatial channels 54, 56 (based on the adaptive power loading). In this manner, the constellation points for the subsequent user data within a data frame may be calibrated during the per stream training. Although this is a useful result, the above described approach leads to a situation where the training symbols are usually sent using a power level that is less than the maximum power level allowed. The FCC places limits on the amount of power, on average, that may be transmitted within certain frequency bands of operation. In the scenario illustrated in FIG. 3, only one of the available spatial channels is excited for each of the OFDM training symbols 58, 60. In accordance with one aspect of the present invention, as will be described in greater detail, each of the OFDM training symbols maybe divided between the available spatial streams in a manner that equalizes the power of the two training symbols. In addition, the transmit power level associated with each tone may be increased by a fixed multiplier. In this manner, a higher overall training transmit power level my be achieved, without exceeding the FCC limit.

Figure 4:
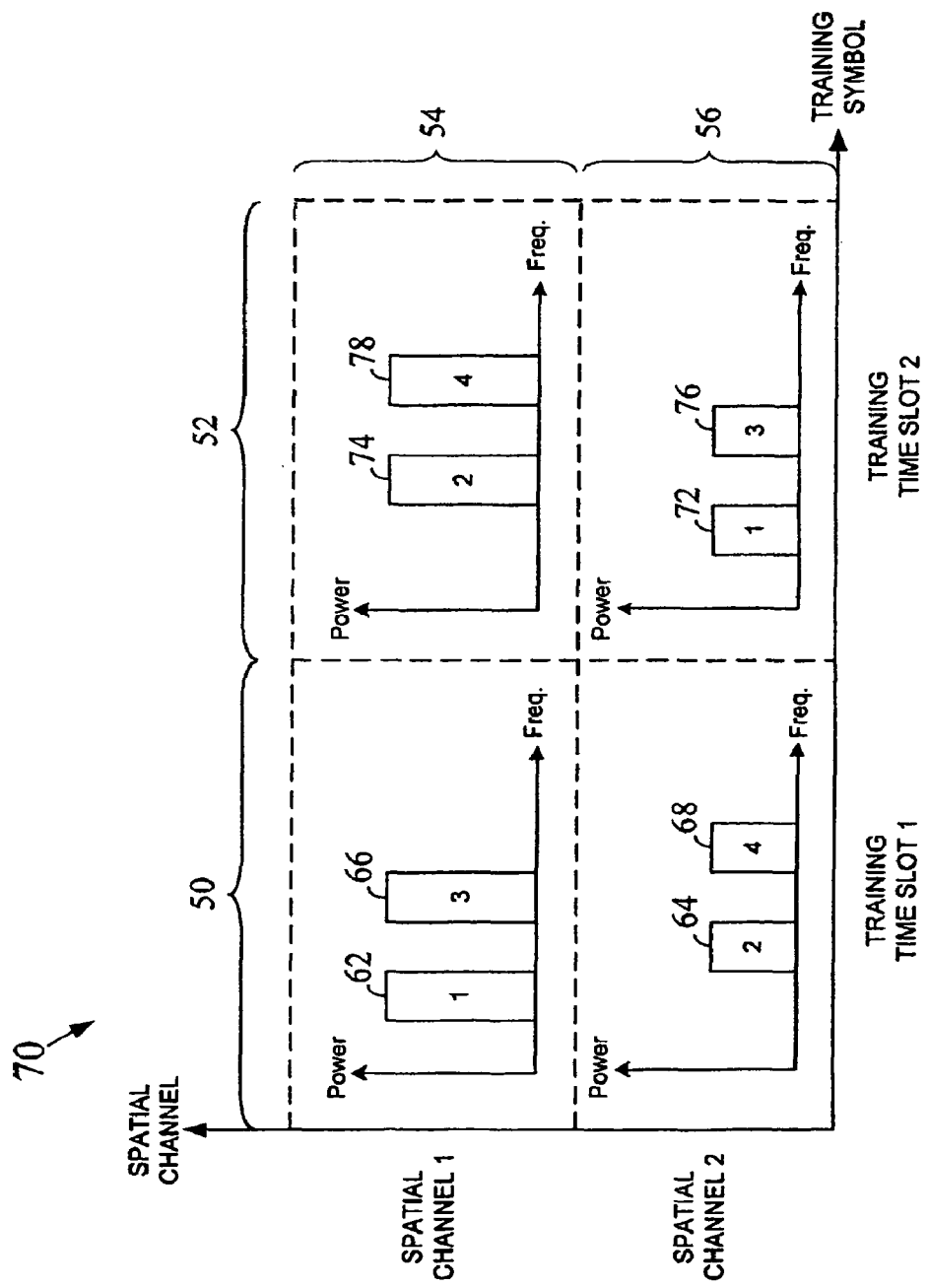
FIG. 4 is a diagram illustrating an example per stream training format that may be used in a MIMO channel having two spatial channels in accordance with an embodiment of the present invention.

FIG. 4 is a diagram illustrating an example per stream training format 70 that may be used in a MIMO channel having two spatial channels in accordance with an embodiment of the present invention. As illustrated, within a first training time slot 50, an OFDM training symbol is frequency interleaved between first and second spatial channels 54, 56. That is, a first tone 62 is transmitted within the first spatial channel 54, a second tone 64 is transmitted within the second spatial channel 56, a third tone 66 is transmitted within the first spatial channel 54, and a fourth tone 68 is transmitted within the second spatial channel 56. Likewise, within the second training time slot 52, an OFDM training symbol is frequency interleaved between the first and second spatial channels 54, 56, but in the opposite manner. That is, a first tone 72 is transmitted within the second spatial channel 56, a second tone 74 is transmitted within the first spatial channel 54, a third tone 76 is transmitted within the second spatial channel 56, and a fourth tone 78 is transmitted within the first spatial channel 54. Thus, at the end of the second training time slot 52, each of the tones of the OFDM training symbol has been transmitted once in each of the two spatial channels.

In addition to interleaving the tones of each training symbol between the two spatial channels, the transmit power levels of the tones may be increased over the adaptive power loading levels of FIG. 3. In one approach, for example, the power level of each of the tones is increased over the corresponding data power level by a factor of K, where K is the number of spatial channels. This is achieved by increasing the magnitude of the tones by $\sqrt{K}$ (i.e., the power level is proportional to the square of the magnitude). Other multiplication factors may alternatively be used. In the illustrated embodiment, therefore, the transmit power level of the tones 62, 66, 74, and 78 within the first spatial channel 54 may be twice the corresponding adaptive power loading levels in the subsequent data portion (e.g., data 46 in FIG. 2), and the power level of the tones 64, 68, 72, and 76 within the second spatial channel 56 may be twice the corresponding adaptive power loading levels in the subsequent data portion (e.g., data 46 in FIG. 2). To perform the constellation point calibrations, the receiving device needs to take the factor of $\sqrt{K}$ into account. The receiving device would typically know the number of spatial channels being used at a particular time and would be able to calculate the value of $\sqrt{K}$ for use during calibration. Using the training format of FIG. 4, the total power of the two spatial channels for each training symbol may be made equal to the FCC limit. Thus, the total training power of the two training symbols is twice that of the training format illustrated in FIG. 3. This results in an improvement in the training signal-to-noise ratio (SNR) of 3 dB.

Figure 5:
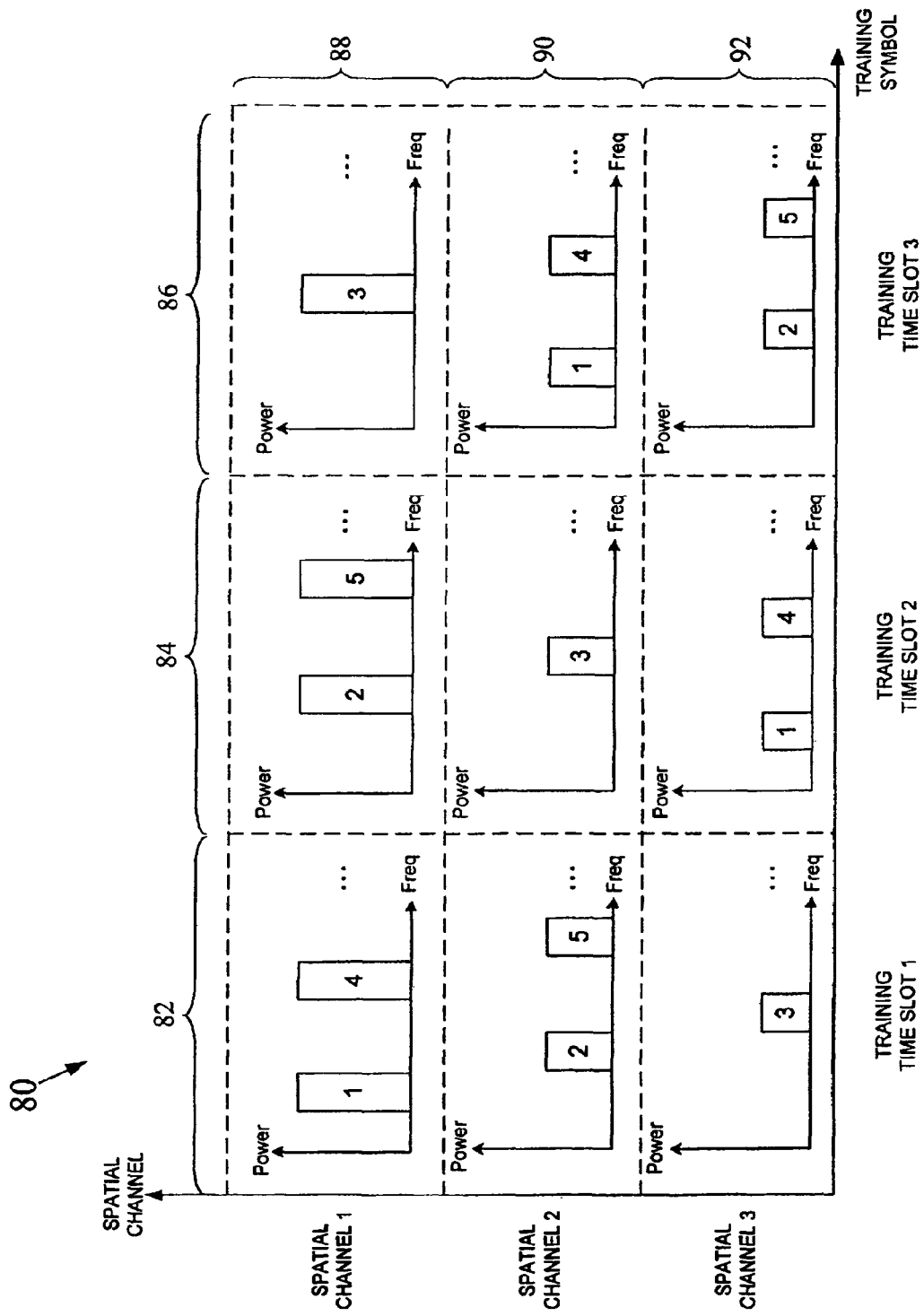
FIG. 5 is a diagram illustrating an example per stream training format that may be used in a MIMO channel having three spatial channels in accordance with an embodiment of the present invention.

FIG. 5 is a diagram illustrating an example per stream training format 80 that may be used in a MIMO channel having three spatial channels in accordance with an embodiment of the present invention. As illustrated, within a first training time slot 82, a first OFDM training symbol is interleaved among the three spatial channels 88, 90, 92; within a second training time slot 84, a second OFDM training symbol is interleaved among the three spatial channels 88, 90, 92; and within a third training time slot 86, a third OFDM training symbol is interleaved among the three spatial channels 88, 90, 92. Each OFDM training symbol tone occurs only once within each spatial channel 88, 90, 92 across the three training time slots 82, 84, 86. In addition, the transmit power levels of the tones within each of the spatial channels 88, 90, 92 is greater than the corresponding adaptive power loading levels by $\sqrt{3}$. This same approach may be extended for use with MIMO channels having four or more spatial channels.

Figure 6:
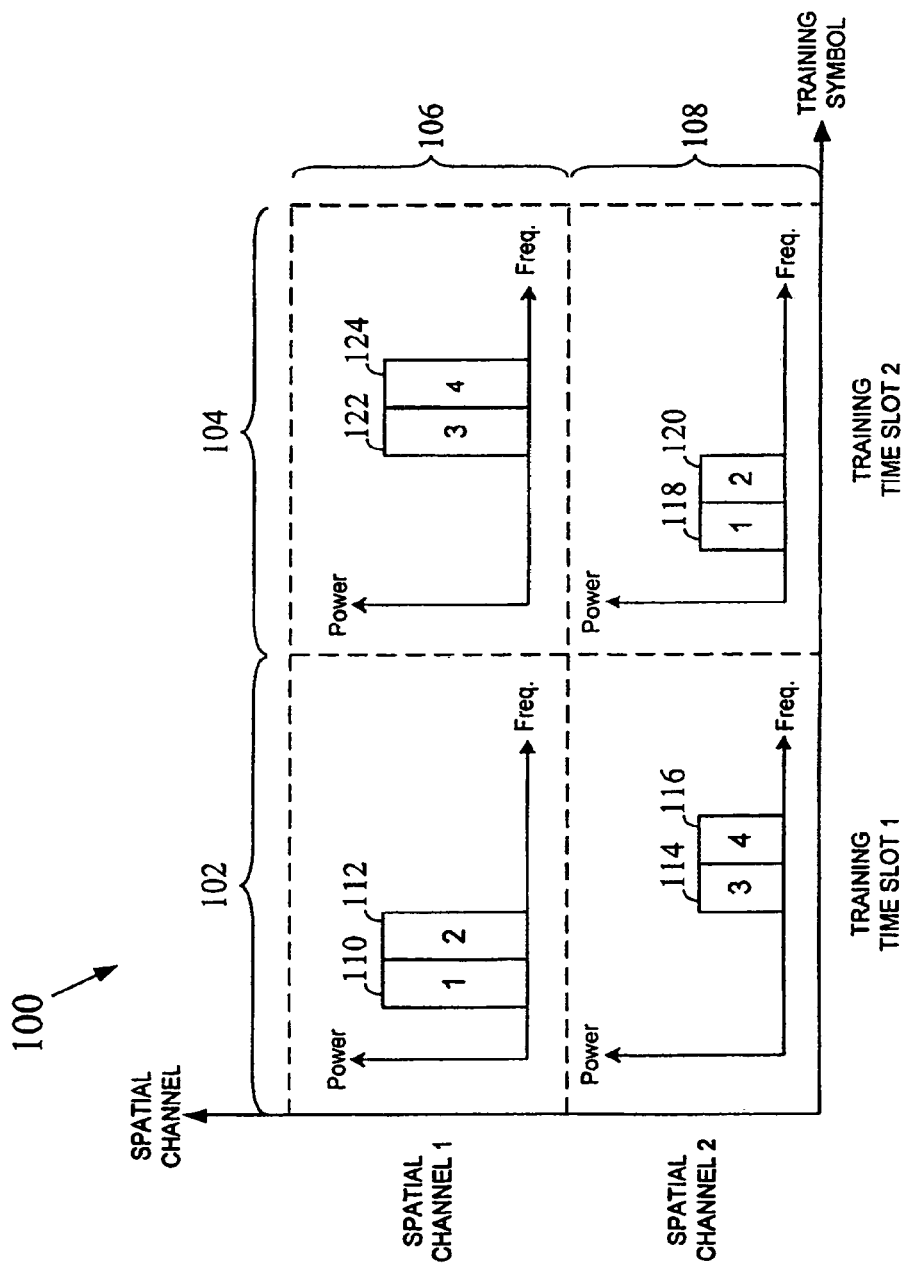
FIG. 6 is a diagram illustrating another example per stream training format that may be used in a MIMO channel having two spatial channels in accordance with an embodiment of the present invention.

To achieve increased training power levels, the OFDM training symbols do not need to be interleaved on a tone by tone basis as described above. That is, the tones of each OFDM training symbol may be divided between the available spatial channels in some other manner. For example, the partition of the tones may not be even or regular as shown in FIGS. 4 and 5. FIG. 6 is a diagram illustrating another example per stream training format 100 that may be used in a MIMO channel having two spatial channels in accordance with an embodiment of the present invention. As shown, instead of interleaving individual tones of each OFDM training symbol over the available spatial channels, groups of tones are distributed across the spatial channels. For example, as illustrated in FIG. 6, within a first training time slot 102, a first group of two adjacent tones (tone 110 and tone 112) may be transmitted within the first spatial channel 106 and a second group of two adjacent tones (tone 114 and tone 116) may be transmitted within the second spatial channel 108. Likewise, within a second training time slot 104, a first group of two adjacent tones (tone 118 and tone 120) may be transmitted within the second spatial channel 108 and a second group of two adjacent tones (tone 122 and tone 124) may be transmitted within the first spatial channel 106. As before, the magnitudes of the tones may be increased by a fixed factor (e.g., $\sqrt{K}$) over the adaptive power loading levels. Any number of tones may be located within each tone group.

In another embodiment of the present invention, the per stream training format of FIG. 3 is modified by increasing the magnitude of each of the tones of the training symbols by a factor of $\sqrt{K}$. In such a case, the average power over K training slots is still equal to the regulated transmission power that is used in the data portion (e.g., data 46 in FIG. 2). This scheme will meet FCC regulation limits if the slot time is small enough.

Figure 7:
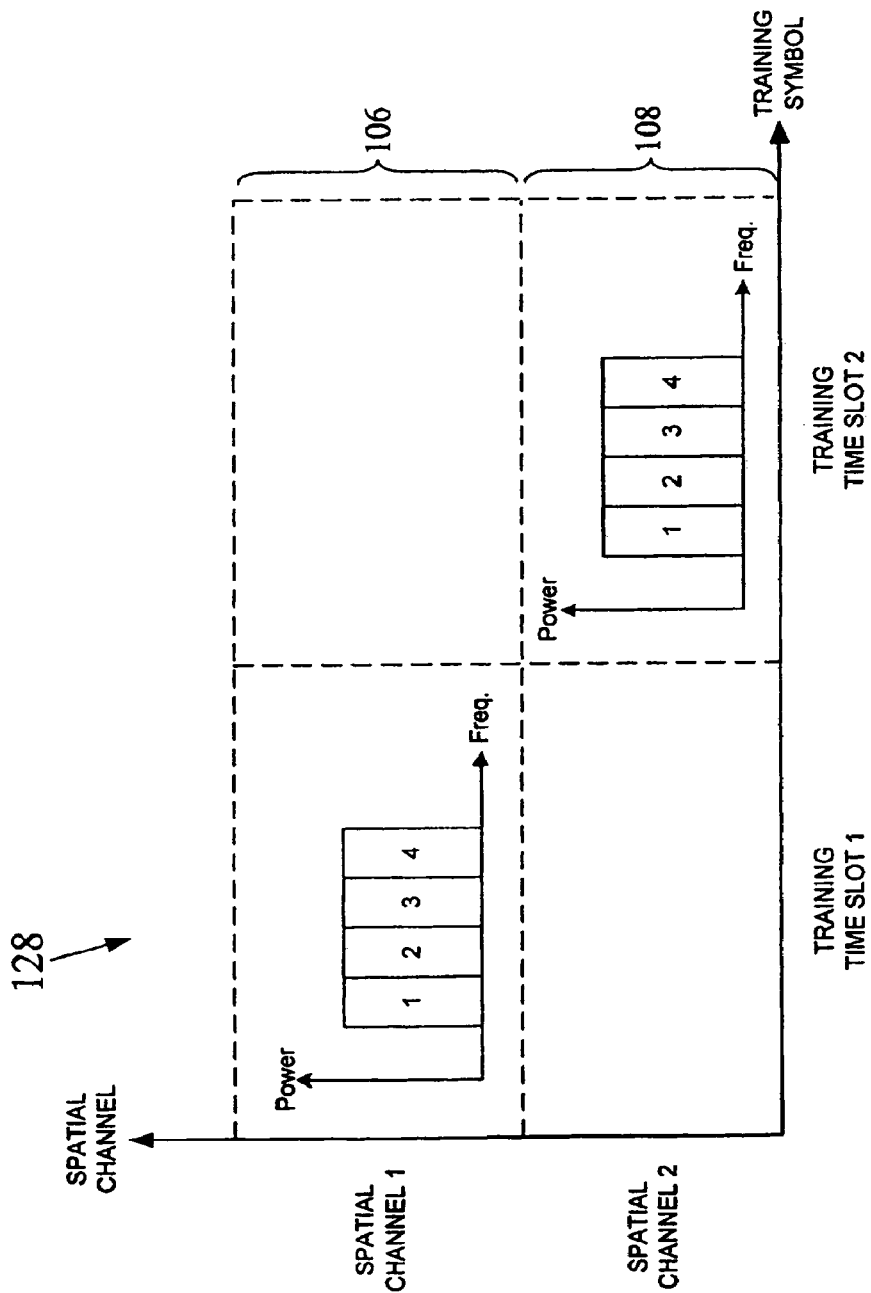
FIG. 7 is a diagram illustrating still another example per stream training format that may be used in a MIMO channel having two spatial channels in accordance with an embodiment of the present invention.

FIG. 7 is a diagram illustrating another example per stream training format 128 that may be used in a MIMO channel having two spatial channels in accordance with an embodiment of the present invention. As illustrated in FIG. 7, the adaptive power loading information is not reflected within the transmit power levels of the OFDM training symbols. Instead, the adaptive power loading information for use in performing the constellation point calibrations may be included within, for example, a header portion (or other overhead portion) of a frame including the user data of interest (e.g., a header portion of the data frame 40 of FIG. 2). In another approach, the adaptive power loading information may be implied within the receiving device based on the selected modulation coding schemes of the user data. As illustrated in FIG. 7, the power level of the tones of the OFDM training symbols may be the same within the first and second spatial channels 106, 108. Also, the total power of the two spatial channels 106, 108 may each be made equal to the FCC limit, thus maximizing the training power level. Each of the OFDM training symbols may be assigned to one of the two spatial channels 106, 108, as illustrated in FIG. 7, or the tones of the OFDM training symbols may be divided amongst the various spatial channels in some fashion (e.g., by interleaving as in FIG. 4, by groupings as in FIG. 6, etc.).

Figure 8:
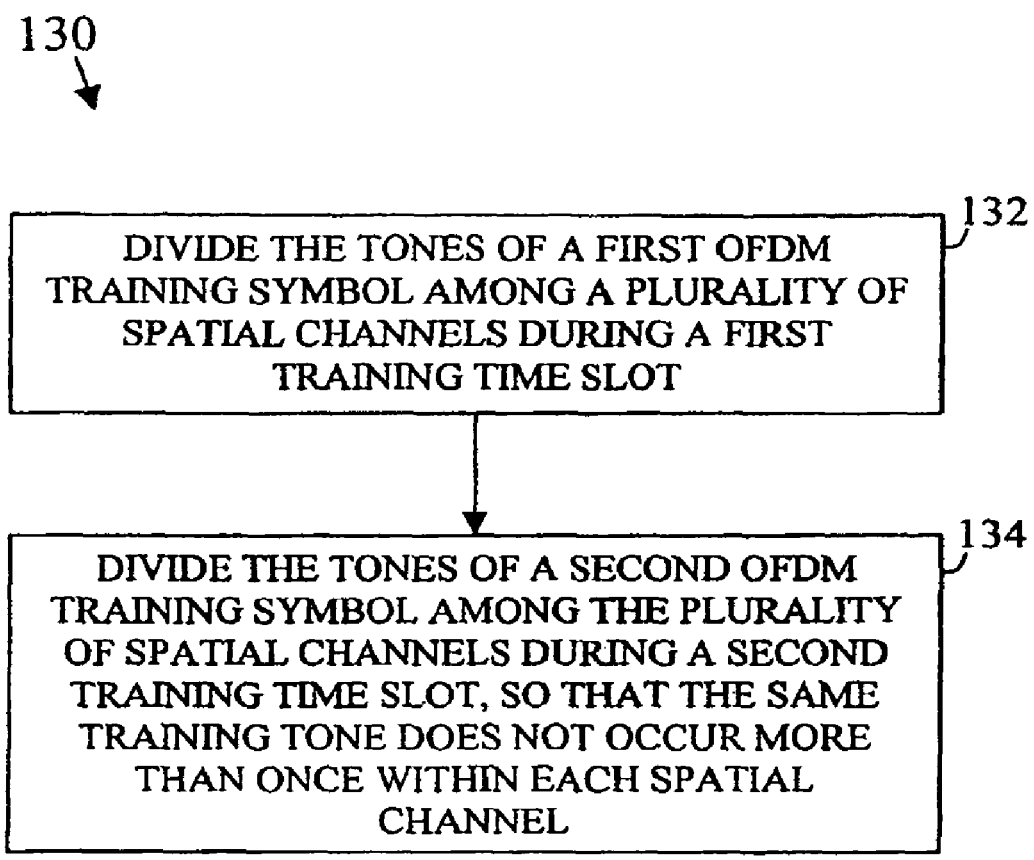
FIG. 8 is a flowchart illustrating an example method for use in performing channel training within a MIMO based wireless network in accordance with an embodiment of the present invention.

FIG. 8 is a flowchart illustrating a method 130 for use in performing channel training within a MIMO based wireless network in accordance with an embodiment of the present invention. During a first training time slot of a wireless data frame, the modulated tones of a first OFDM training symbol are divided among a plurality of spatial channels (block 132). The first OFDM training symbol is a symbol that is known by the device that will be receiving the data frame. The modulated tones of the OFDM training symbol may be divided among the spatial channels in any of a variety of different ways. For example, in one approach, the tones are interleaved on a tone by tone basis across the spatial channels as illustrated in FIGS. 4 and 5. In another possible approach, groups of adjacent tones may be interleaved across the spatial channels, as shown in, for example, FIG. 6. Other techniques for dividing the modulated tones across the spatial channels may alternatively be used. The number of tones assigned to each spatial channel should be approximately equal.

During a second training time slot of the wireless data frame, the modulated tones of a second OFDM training symbol are divided among the plurality of spatial channels (block 134). The second OFDM training symbol may be the same known symbol that was used during the first training time slot. However, this time the division of tones is performed so that none of the same tones that were previously assigned to a particular spatial channel are repeated within that spatial channel. For example, in the embodiment illustrated in FIG. 4, the first tone 62 and the third tone 66 are transmitted within the first spatial channel 54 during the first training time slot 50 while the second tone 74 and the fourth tone 78 are transmitted within the first spatial channel 54 during the second training time slot 52. A similar situation exists in the second spatial channel 56. Likewise, in the embodiment illustrated in FIG. 6, the first tone 110 and the second tone 112 are transmitted within the first spatial channel 106 during the first training time slot 102 while the third tone 122 and the fourth tone 124 are transmitted within the first spatial channel 106 during the second training time slot 104. A similar situation exists in the second spatial channel 108. If there are three or more spatial channels, additional training time slots may be used and the tones of corresponding OFDM training symbols may again be divided among the spatial channels.

By dividing the OFDM training symbols as described above, the training power may be equalized across the training symbols. In addition to dividing the tones, the transmit power levels of the tones may be increased over the levels dictated for the user data based on the adaptive power loading. For example, in at least one embodiment of the present invention, the transmit power level of the tones within each of the spatial channels will be a fixed factor greater than the corresponding adaptive power loading levels (i.e., the transmit power level of the user data transmitted within the same spatial channel). In one possible approach, as described previously, the fixed factor is K, where K is the number of spatial channels being used (i.e., the magnitude of the tones is increased by $\sqrt{K}$).

Figure 9:
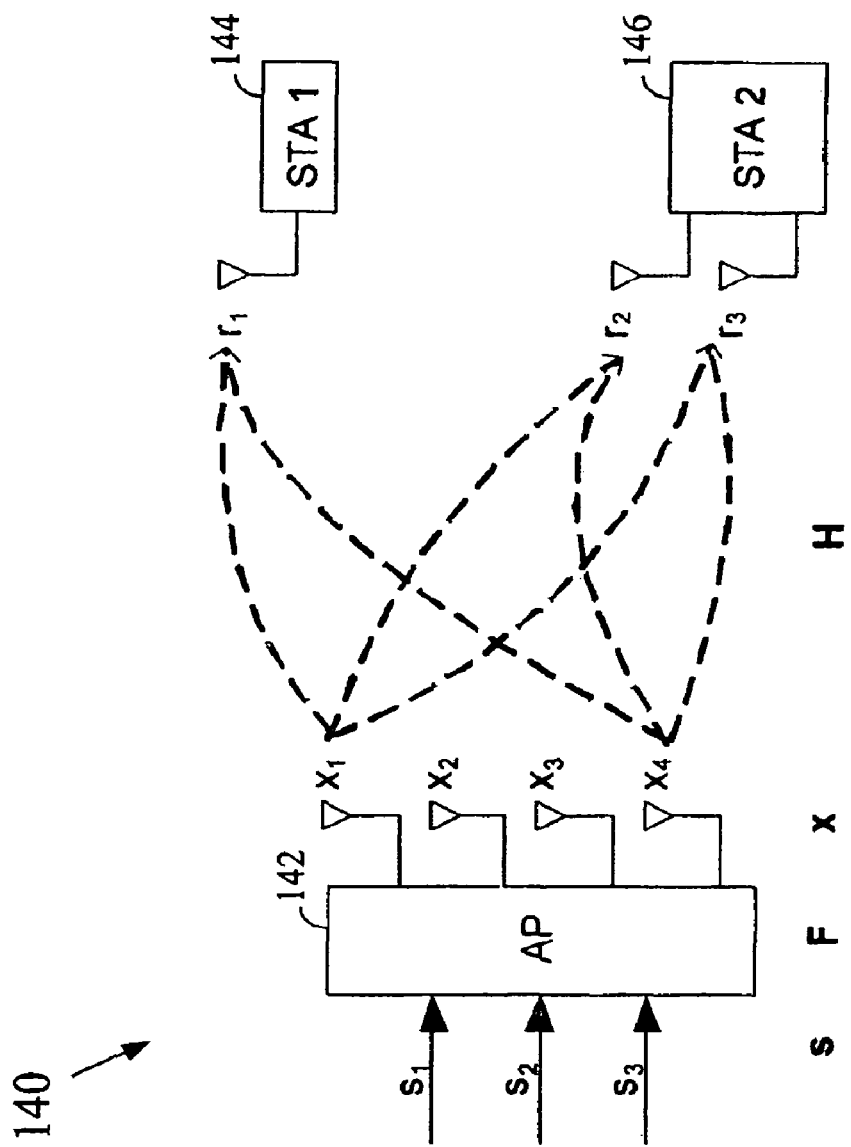
FIG. 9 is a block diagram illustrating an example SDMA system in accordance with an embodiment of the present invention.

In the above-described embodiments; the invention is described in the context of a closed loop MIMO channel between a wireless access point and a client device. Other applications also exist. In at least one embodiment, for example, the inventive techniques are implemented within a spatial division multiple access (SDMA) system, which is a multi-user form of MIMO. In an SDMA system, an access point (or base station) will typically have multiple antennas and each mobile station (or subscriber station) may have one or multiple antennas. In the downlink channel, the AP may send data to multiple stations simultaneously through multiple spatial channels. The AP may assign one or multiple spatial channels to each STA depending on, for example, the number of receive antennas at the station and the quality of the channel between the AP and the STA. FIG. 9 is a block diagram illustrating an example SDMA system in accordance with an embodiment of the present invention. As illustrated, a wireless AP 142 is communicating with multiple STAs 144, 146 (STA 1 and STA 2). In the AP 142, a signal vector s is operated upon by a beam forming matrix (or precoder) F to generate a signal vector x to be transmitted by multiple transmit antennas associated with the AP 142. In the illustrated embodiment, the signal vectors is a signal vector for three spatial channels which may be expressed as follows:

$$s = \begin{bmatrix} s_1 \\ s_2 \\ s_3 \end{bmatrix}$$

The beamforming matrix F has dimension 4 by 3. The signal vector x is transmitted from 4 transmit antennas and has the form:

$$x = \begin{bmatrix} x_1 \\ \vdots \\ x_4 \end{bmatrix}$$

Other arrangements may alternatively be used. The transmitted vector x is acted upon by a channel matrix H. In the illustrated embodiment, the channel matrix H is a 3×4 matrix. A conventional beamforming matrix is called zero-forcing. It pre-cancels the interference between spatial streams that will be induced by the channel (i.e., H). The beamforming matrix for this case is the pseudo inverse of the channel matrix H, which may be expressed as follows:

$$F = H^H (H H^H)^{-1}$$

where $^H$ denotes the operations of conjugate and transpose. Therefore, the received signal vector at the receive antennas of the stations 144, 146 is:

$$r = \begin{bmatrix} s_1 \\ s_2 \\ s_3 \end{bmatrix}$$

which is equal to the transmitted signal vector. Power loading can be done for each data stream $s_i$ in order to both satisfy FCC regulations and improve system performance. This is similar to the original MIMO case. In accordance with the invention, each training symbol transmitted by the AP 142 may be divided amongst the various spatial streams during a corresponding training time slot (as described previously). The power level of each of the tones of the training symbol may be set to a level that is a fixed factor (e.g., K) greater than a data power level used within the same data frame (where K is the number of spatial channels).

The techniques and structures of the present invention may be implemented in any of a variety of different forms. For example, features of the invention may be embodied within laptop, palmtop, desktop, and tablet computers having wireless capability; personal digital assistants (PDAs) having wireless capability; pagers; satellite communicators; cellular telephones and other handheld wireless communicators; cameras having wireless capability; audio/video devices having wireless capability; network interface cards (NICs) and other network interface structures; integrated circuits; as instructions and/or data structures stored on machine readable media, and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

The invention claimed is:

1. A computer implemented method for use in performing channel training in a multiple input, multiple output (MIMO) based multicarrier system having a MIMO channel with multiple spatial channels, comprising:

receiving a data frame from a remote transmitter via a MIMO channel having at least a first spatial channel and a second spatial channel, said data frame having a per stream training portion carrying channel training symbols to separately train said first spatial channel and said second spatial channel and a data portion carrying user data, said data portion carrying first user data in said first spatial channel and second user data in said second spatial channel;

determining, using said received data frame, a first modulation coding scheme used to modulate and code said first user data and a second modulation coding scheme used to modulate and code said second user data;

estimating power loading information for said data frame based on said first modulation coding scheme and said second modulation coding scheme; and using said estimated power loading information to calibrate constellation points for said first and second user data.

2. The method of claim 1, wherein:
said MIMO based multicarrier system is an orthogonal frequency division multiplexing (OFDM) system.

3. The method of claim 1, wherein:
said per stream training portion of said data frame includes a first channel training symbol transmitted via said first spatial channel and a second channel training symbol transmitted via said second spatial channel, wherein said first channel training symbol and said second channel training symbol were transmitted at equal power levels.

4. The method of claim 3, wherein:
said first channel training symbol and said second channel training symbol were each transmitted at a highest power permitted by FCC limits.

5. The method of claim 1, wherein:
estimating power loading information includes estimating a ratio between a power level used to transmit said first user data in said first spatial channel and a power level used to transmit said second user data in said second spatial channel.

6. The method of claim 1, wherein:
said MIMO channel includes more than two spatial channels and said data frame was transmitted via at least three spatial channels, wherein said method further includes determining a modulation coding scheme used to modulate and code user data within each of said at least three spatial channels other than said first and second spatial channels;

wherein estimating power loading information for said data frame includes estimating power loading information for said data frame based on, in addition to said first modulation coding scheme and said second modulation coding scheme, the modulation coding schemes of each of said at least three spatial channels other than said first and second spatial channels.

7. The method of claim 6, wherein:
using said estimated power loading information to calibrate constellation points further includes using said estimated power loading information to calibrate constellation points for user data transmitted within each of said at least three spatial channels other than said first and second spatial channels.

8. An apparatus for use in a multiple input, multiple output (MIMO) based multicarrier system having a MIMO channel with multiple spatial channels, comprising:

a receiver to receive a data frame from a remote transmitter via a MIMO channel having at least a first spatial channel and a second spatial channel, said data frame having a per stream training portion carrying channel training symbols to separately train said first spatial channel and said second spatial channel and a data portion carrying user data, said data portion carrying first user data in said first spatial channel and second user data in said second spatial channel; and a controller to:
determine, using said received data frame, a first modulation coding scheme used to modulate and code said first user data and a second modulation coding scheme used to modulate and code said second user data;

estimate power loading information for said data frame based on said first modulation coding scheme and said second modulation coding scheme; and use said estimated power loading information to calibrate constellation points for said first and second user data.

9. The apparatus of claim 8, wherein:
said MIMO based multicarrier system is an orthogonal frequency division multiplexing (OFDM) system.

10. The apparatus of claim 8, wherein:
said per stream training portion of said data frame includes a first channel training symbol transmitted via said first spatial channel and a second channel training symbol transmitted via said second spatial channel, wherein said first channel training symbol and said second channel training symbol were transmitted at equal power levels.

11. The apparatus of claim 10, wherein:
said first channel training symbol and said second channel training symbol were each transmitted at a highest power permitted by FCC limits.

12. The apparatus of claim 8, wherein:
said controller estimates said power loading information by estimating a ratio between a power level used to transmit said first user data in said first spatial channel and a power level used to transmit said second user data in said second spatial channel.

13. The apparatus of claim 8, wherein:
said MIMO channel includes more than two spatial channels and said data frame was transmitted via at least three spatial channels, wherein said controller is operative to (a) determine a modulation coding scheme used to modulate and code user data within each of said at least three spatial channels, and (b) estimate power loading information for said data frame based on modulation coding schemes of each of said at least three spatial channels.

14. The apparatus of claim 13, wherein:
said controller is operative to use said estimated power loading information to calibrate constellation points for user data transmitted within each of said at least three spatial channels.

15. A non-transitory computer readable storage medium having computer implementable instructions stored thereon that, when executed by a computing platform, operate to:
obtain a data frame received from a remote transmitter via a MIMO channel having at least a first spatial channel and a second spatial channel, said data frame having a per stream training portion carrying channel training symbols to separately train said first spatial channel and said second spatial channel and a data portion carrying user data, said data portion carrying first user data from said first spatial channel and second user data from said second spatial channel;

determine, using said received data frame, a first modulation coding scheme used to modulate and code said first user data and a second modulation coding scheme used to modulate and code said second user data;

estimate power loading information for said data frame based on said first modulation coding scheme and said second modulation coding scheme; and use said estimated power loading information to calibrate constellation points for said first and second user data.

16. The non-transitory computer readable storage medium of claim 15, wherein:

said computer readable storage medium is for use within a MIMO based orthogonal frequency division multiplexing (OFDM) system.

17. The non-transitory computer readable storage medium of claim 15, wherein:

said per stream training portion of said data frame includes a first channel training symbol transmitted via said first spatial channel and a second channel training symbol transmitted via said second spatial channel, wherein said first channel training symbol and said second channel training symbol were transmitted at equal power levels.

18. The non-transitory computer readable storage medium of claim 17, wherein:

said first channel training symbol and said second channel training symbol were each transmitted at a highest power permitted by FCC limits.

19. The non-transitory computer readable storage medium of claim 15, wherein:

said MIMO channel includes more than two spatial channels and said data frame was transmitted via at least three spatial channels, wherein said computer implementable instructions further operate to determine a modulation coding scheme used to modulate and code user data within each of said at least three spatial channels other than said first and second spatial channels;

wherein said operation to estimate power loading information for said data frame includes an operation to estimate power loading information for said data frame based on, in addition to said first modulation coding scheme and said second modulation coding scheme, the modulation coding schemes of each of said at least three spatial channels other than said first and second spatial channels.

20. The non-transitory computer readable storage medium of claim 19, wherein:

wherein said operation to use said estimated power loading information to calibrate constellation points further includes an operation to use said estimated power loading information to calibrate constellation points for user data transmitted within each of said at least three spatial channels other than said first and second spatial channels.

* * * * *